(12) United States Patent
Pradeep et al.

(10) Patent No.: US 9,779,508 B2
(45) Date of Patent: Oct. 3, 2017

(54) REAL-TIME THREE-DIMENSIONAL RECONSTRUCTION OF A SCENE FROM A SINGLE CAMERA

(71) Applicant: Microsoft Corporation, Redmond, WA (US)

(72) Inventors: Vivek Pradeep, Snohomish, WA (US); Christoph Rhemann, Cambridge (GB); Shahram Izadi, Cambridge (GB); Christopher Zach, Cambridge (GB); Michael Bleyer, Seattle, WA (US); Steven Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 14/226,732

(22) Filed: Mar. 26, 2014

(65) Prior Publication Data

US 2015/0279083 A1    Oct. 1, 2015

(51) Int. Cl.
*G06T 17/00* (2006.01)
*G06T 7/593* (2017.01)
*G06T 7/00* (2017.01)

(52) U.S. Cl.
CPC ............ *G06T 7/0044* (2013.01); *G06T 7/593* (2017.01); *G06T 17/00* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| 6,351,572 | B1 | 2/2002 | Dufour |
| 8,570,320 | B2 | 10/2013 | Izadi et al. |
| 9,111,350 | B1* | 8/2015 | Mukherjee ............ G06T 7/0075 |
| 2002/0101442 | A1* | 8/2002 | Costanzo .......... H04L 29/06027 715/723 |
| 2011/0074770 | A1* | 3/2011 | Robinson ................ G06T 15/20 345/419 |

(Continued)

FOREIGN PATENT DOCUMENTS

DE    WO 2013029675 A1 *  3/2013  ........... G06T 7/0028

OTHER PUBLICATIONS

Hoppe, Hugues, et al. Surface reconstruction from unorganized points. vol. 26. No. 2. ACM, 1992.*

(Continued)

*Primary Examiner* — Kee M Tung
*Assistant Examiner* — Xin Sheng

(57) ABSTRACT

A combination of three computational components may provide memory and computational efficiency while producing results with little latency, e.g., output can begin with the second frame of video being processed. Memory usage may be reduced by maintaining key frames of video and pose information for each frame of video. Additionally, only one global volumetric structure may be maintained for the frames of video being processed. To be computationally efficient, only depth information may be computed from each frame. Through fusion of multiple depth maps from different frames into a single volumetric structure, errors may average out over several frames, leading to a final output with high quality.

20 Claims, 6 Drawing Sheets

(56) References Cited

U.S. PATENT DOCUMENTS

| | | | | |
|---|---|---|---|---|
| 2011/0141237 | A1* | 6/2011 | Cheng | H04N 13/026 348/46 |
| 2011/0273531 | A1* | 11/2011 | Ito | H04N 13/026 348/43 |
| 2013/0060540 | A1 | 3/2013 | Frahm et al. | |
| 2013/0215221 | A1* | 8/2013 | Wang | G06T 7/0042 348/43 |
| 2014/0037189 | A1* | 2/2014 | Ziegler | G06T 17/00 382/154 |

OTHER PUBLICATIONS

Yemez, et al., "A Volumetric Fusion Technique for Surface Reconstruction from Silhouettes and Range Data", In Journal of Computer Vision and Image Understanding, vol. 105, Issue 1, Jan. 2007, 12 pages.

Bowden, et al., "Reconstructing 3D Pose and Motion from a Single Camera View", In Proceedings of British Machine Vision Conference, Sep. 1998, 10 pages.

Zach, et al., "High-Performance Multi-View Reconstruction", In Proceedings of the Third International Symposium on 3D Data Processing, Visualization, and Transmission, Jun. 14, 2006, 8 pages.

Benhimane, et al., "Real-Time Image-Based Tracking of Planes Using Efficient Second-Order Minimization", In IEEE/RSJ International Conference on Intelligent Robots and Systems, Sep. 28, 2004, 6 pages.

Bleyer, et al., "Patchnnatch Stereo—Stereo Matching with Slanted Support Windows", In 22nd British Machine Vision Conference, Aug. 29, 2011, 11 pages.

Curless, et al., "A Volumetric Method for Building Complex Models from Range Images", In Proceedings of the 23rd Annual Conference on Computer Graphics and Interactive Techniques, Aug. 4, 1996, 10 pages.

De-Maeztu, et al., "Linear Stereo Matching", In 13th International Conference on Computer Vision, Nov. 6, 2011, 8 pages.

Ernst, et al., "Mutual Information Based Semi-Global Stereo Matching on the GPU", In Proceedings of the 4th International Symposium on Advances in Visual Computing, Dec. 1, 2008, 11 pages.

Fischler, et al., "Random Sample Consensus: A Paradigm for Model Fitting with Applications to Image Analysis and Automated Cartography", In Communications of the ACM, vol. 24, Issue 6, Jun. 1981, 15 pages.

Henry, et al., "RGB-D Mapping: Using Depth Cameras for Dense 3D Modeling of Indoor Environments", In 12th International Symposium on Experimental Robotics, vol. 20, Dec. 18, 2010, 15 pages.

Hirschmuller, Heiko, "Accurate and Efficient Stereo Processing by Semi-global Matching and Mutual Information", In Proceedings of the IEEE Computer Society Conference on Computer Vision and Pattern Recognition, vol. 2, Jun. 20, 2005, 8 pages.

Hornung, et al., "OctoMap: An Efficient Probabilistic 3D Mapping Framework Based on Octrees", In Autonomous Robots, vol. 34, Issue 3, Apr. 2013, 17 pages.

Izadi, et al., "KinectFusion: Real-Time 3D Reconstruction and Interaction using a Moving Depth Camera", In ACM Symposium on User Interface Software and Technology, Oct. 16, 2011, 10 pages.

Ju, et al., "Constant Time Stereo Matching", In 13th International Machine Vision and Image Processing Conference, Sep. 2, 2009, 5 pages.

Klein, et al., "Parallel Tracking and Mapping for Small AR Workspaces", In 6th IEEE and ACM International Symposium on Mixed and Augmented Reality, Nov. 13, 2007, 10 pages.

Levoy, et al., "The Digital Michelangelo Project: 3D Scanning of Large Statues", In Proceedings of the 27th Annual Conference on Computer Graphics and Interactive Techniques, Jul. 2000, 14 pages.

Lourakis, et al., "SBA: A Software Package for Generic Sparse Bundle Adjustment", In ACM Transactions on Mathematical Software, vol. 36, Issue 1, Mar. 2009, 30 pages.

Lowe, David G., "Distinctive Image Features from Scale-Invariant Keypoints", In International Journal of Computer Vision, vol. 60, Issue 2, Nov. 2004, 28 pages.

Merrell, et al., "Real-Time Visibility-Based Fusion of Depth Maps", In IEEE 11th International Conference on Computer Vision, Oct. 14, 2007, 8 pages.

Michael, et al., "Real-Time Stereo Vision: Optimizing Semi-Global Matching", In IEEE Intelligent Vehicles Symposium, Jun. 23, 2013, 6 pages.

Newcombe, et al., "Live Dense Reconstruction with a Single Moving Camera", In Proceeding of the Twenty-Third IEEE Conference on Computer Vision and Pattern Recognition, Jun. 13, 2010, 8 pages.

Newcombe, et al., "KinectFusion: Real-Time Dense Surface Mapping and Tracking", In IEEE International Symposium on Mixed and Augmented Reality, Oct. 2011, 10 pages.

Newcombe, et al., "DTAM: Dense Tracking and Mapping in Real-Time", In 13th International Conference on Computer Vision, Nov. 2011, 8 pages.

Nister, David, "An Efficient Solution to the Five-Point Relative Pose Problem", In IEEE Computer Society Conference on Computer Vision and Pattern Recognition, vol. 2, Jun. 2004, 8 pages.

Pollefeys, et al., "Detailed Real-Time Urban 3D Reconstruction from Video", In International Journal of Computer Vision, vol. 78, Issue 2-3, Jul. 2008, 43 pages.

Pollefeys, et al., "Visual Modeling with a Hand-Held Camera", In International Journal of Computer Vision, vol. 59, Issue 3, Sep. 2004, 37 pages.

Rhemann, et al., "Fast Cost-Volume Filtering for Visual Correspondence and Beyond", In IEEE Conference on Computer Vision and Pattern Recognition, Jun. 20, 2011, 8 pages.

Richardt, et al., "Realtime Spatiotemporal Stereo Matching using the Dualcross-Bilateral Grid", In European Conference on Computer Vision, Sep. 5, 2010, 14 pages.

Rosenberg, et al., "Real-Time Stereo Vision using Semi-Global Matching on Programmable Graphics Hardware", In International Conference on Computer Graphics and Interactive Techniques—SIGGRAPH, Jul. 2006, 1 pages.

Rosten, et al., "Machine Learning for High-Speed Corner Detection", In Proceedings of the 9th European Conference on Computer Vision—vol. Part I, May 7, 2006, 14 pages.

Scharstein, et al., "A Taxonomy and Evaluation of Dense Two-Frame Stereo Correspondence Algorithms", In International Journal of Computer Vision, May 2002, 35 pages.

Seitz, et al., "A Comparison and Evaluation of Multi-View Stereo Reconstruction Algorithms", In IEEE Computer Society Conference on Computer Vision and Pattern Recognition—vol. 1, Jun. 17, 2006, 8 pages.

Stuckler, et al., "Robust Real-Time Registration of RGB-D Images using Multi-Resolution Surfel Representations", In Proceeding of the German Conference on Robotics (ROBOTIK), May 2012, 4 pages.

Veksler, Olga, "Stereo Correspondence by Dynamic Programming on a Tree", In IEEE Computer Society Conference on Computer Vision and Pattern Recognition, vol. 2, Jun. 20, 2005, 7 pages.

Weise, et al., "In-Hand Scanning with Online Loop Closure", In IEEE 12th International Conference on Computer Vision Workshops, Sep. 27, 2009, 8 pages.

Zach, Christopher, "Fast and High Quality Fusion of Depth Maps", In Fourth International Symposium on 3D Data Processing, Visualization and Transmission, Jun. 18, 2008, 8 pages.

Zach, et al., "A Globally Optimal Algorithm for Robust TV-L1 Range Image Integration", In IEEE 11th International Conference on Computer Vision, Oct. 14, 2007, 8 pages.

Zhang, et al., "Joint Integral Histograms and its Application in Stereo Matching", In 17th IEEE International Conference on Image Processing, Sep. 26, 2010, 4 pages.

Zeng, et al., "Octree-based Fusion for Realtime 3D Reconstruction", In Journal of Graphical Models, vol. 75, Issue 3, May 2013, 17 pages.

Furukawa, Yasutaka. "Towards Internet-scale Multi-view Stereo". in Proceedings of Computer Vision and Pattern Recognition 2010

(56) References Cited

OTHER PUBLICATIONS (CVPR 2010) conference, p. 1434, retrieved from http://www.cse.wustl.edu/~furukawa/papers/cvpr10.pdf Jun. 2, 2016.

* cited by examiner

```
Data Structures key frame 500
        image data [x, y, pixel value] 502
        pose information 504

Depth map 510
        map [x, y, depth value] 512
        other data 514

Three dimensional model 520
        virtual volume [x, y, z] 522
        list of surfaces 524
        surface -> signed distance field 526
```

FIG.5

REAL-TIME THREE-DIMENSIONAL RECONSTRUCTION OF A SCENE FROM A SINGLE CAMERA

BACKGROUND

There has been an increasing interest in using consumer mobile devices, such as tablet computers and mobile phones, for so-called augmented reality or mixed reality applications. Using such applications, an individual can manipulate virtual objects in virtual scenes on a device based on images captured by the device of its surroundings.

SUMMARY

This Summary is provided to introduce a selection of concepts in a simplified form that are further described below in the Detailed Description. This Summary is intended neither to identify key or essential features, nor to limit the scope, of the claimed subject matter.

A combination of three computational components provides memory and computational efficiency while producing results with little latency, e.g., output can begin with the second frame of video being processed. Memory usage is reduced by maintaining key frames of video and pose information for each frame of video, but not retaining image data from all frames of video being processed. Additionally, only one global volumetric structure is maintained for the frames of video being processed. To be computationally efficient, only depth information is computed from each frame. Through fusion of multiple depth maps from different frames into a single volumetric structure, errors average out over several frames, leading to a final output with high quality.

Accordingly in one aspect, a device has a camera tracking circuit, a depth map estimation circuit and a volumetric fusion circuit. The camera tracking module has an input to receive an image from a sequence of images and an output to provide a pose for the camera. It also provides an output storing the image as a key frame based on the pose of the image and a pose of other stored key frames. The depth map estimation circuit has an input to receive the image from the sequence of images and one or more key frames from among the stored key frames selected for the image. This circuit has an output to provide a depth map for the image. The volumetric fusion circuit has an input to receive the depth map for the image and an output to provide a three-dimensional model as a fusion of depth maps received for the sequence of images.

In another aspect, a process for generating a three-dimensional model from a sequence of images from a camera involves repeating several steps for each image in the sequence of images. For each image, one or more key frames are selected from the sequence of images. A depth map for the image is determined using the image and the selected one or multiple key frames. The depth map is merged into a volumetric representation of a scene represented in the image.

In another aspect, a computer program product includes a computer storage device. Computer program instructions are stored in the computer storage device that, when read from the storage device and processed by a processor or circuit of a computer, instruct the computer to perform a process for generating a three-dimensional model from a sequence of images from a camera. This process involves repeating several steps for each image in the sequence of images. For each image, one or more key frames are selected from the sequence of images. A depth map for the image is determined using the image and the selected key frame. The depth map is merged into a volumetric representation of a scene represented in the image.

In some implementations, one or more processing units are housed in a mobile device that incorporates the camera. The depth map for an image can include a measure of depth for each pixel in the image. The pose for an image can include rotation and translation of the camera with respect to a fixed coordinate system. The three-dimensional model can be defined in a virtual volume, wherein an initial pose of the camera is defined at a point in the virtual volume. The three-dimensional model can be defined by representing a surface using a signed distance field in the virtual volume. The three-dimensional model can be output after processing a first and second image from the image sequence, and thus with low latency.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 5 is a diagram of example data structures that can be used in the processing pipeline shown in FIG. 3.

DETAILED DESCRIPTION

A system may use stereoscopic imaging with high resolution cameras or special purpose hardware to construct three-dimensional models of scenes. Such hardware may be significantly more expensive than, and thus, not commonly available for, various consumer electronics. Techniques for generating three-dimensional models using a single camera may use active illumination or structured light, or may employ time of flight cameras. These approaches may be expensive in terms of production cost and power utilization. These techniques may be computationally intensive, use significant amounts of memory, and use several frames of image data before imaging results are available.

Consumer mobile devices may have a single camera of relatively low quality, limited memory, and relatively simple processing capability, such as a single general purpose processor or programmable integrated circuit. Consumer mobile devices may lack additional light sources, and may rely on battery power for operation. These mobile device aspects limit imaging techniques difficult on these devices.

The following section describes an example device with a single camera from which a three-dimensional model can be reconstructed for use in augmented and/or virtual reality applications using the device.

Figure 1:
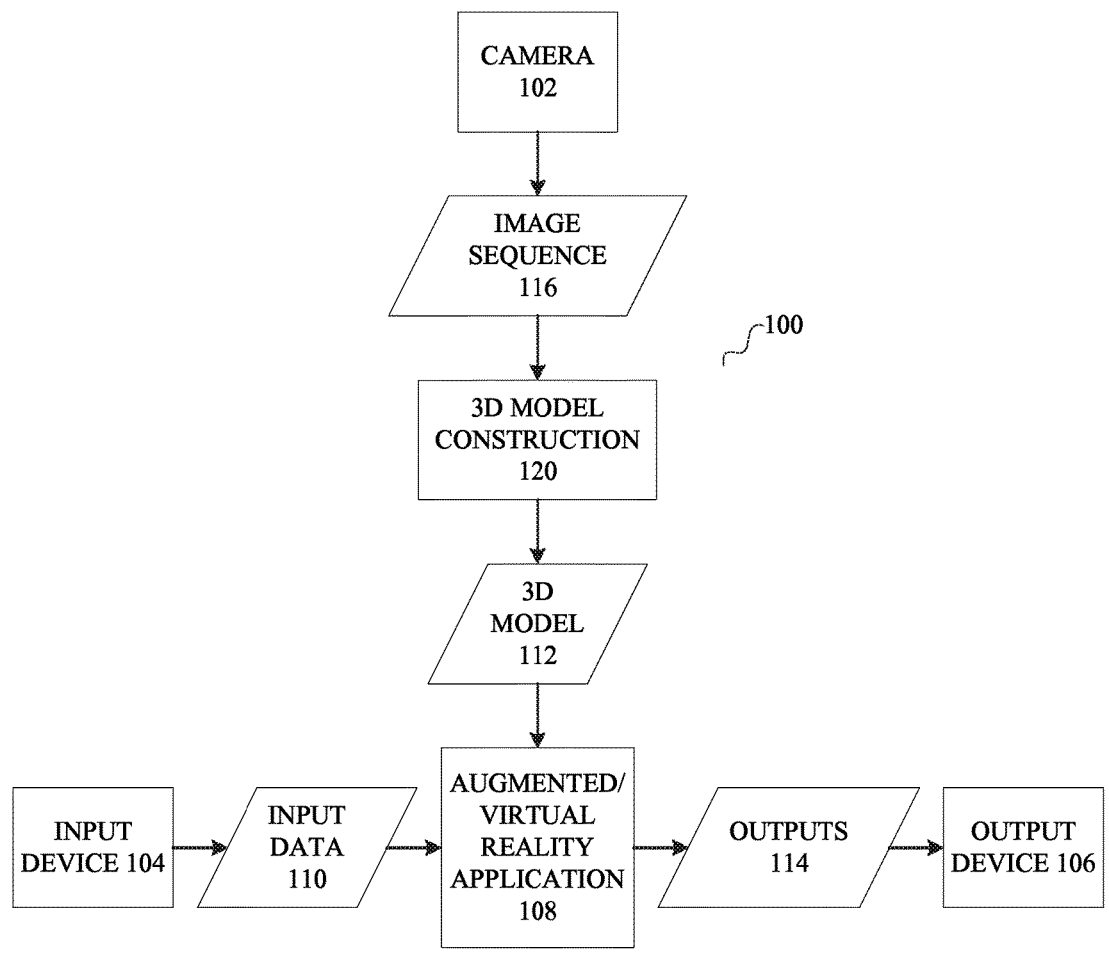
FIG. 1 is a block diagram of an example device with a single camera from which a three-dimensional model can be reconstructed for use in augmented and/or virtual reality applications using the device.

Referring to FIG. 1, a mobile device 100 with a single camera 102, such as a mobile phone, tablet computer, wearable device, or other mobile device, provides an end user with input devices 104, such as a touch sensor, microphone and the like, and output devices 106, such as a display and audio speakers. In this example, an augmented reality or virtual reality application 108 receives input data 110 from the input devices 104 and a three-dimensional model 112 of a scene, and provides outputs 114 to the output devices 106.

With a mobile device, camera, memory, processing and power resources are generally limited in comparison to other computers, such as desktops. For example, on the mobile device 100, there may be a single camera 102 that provides an image sequence 116. There may be a single processor, limited random access memory, and limited persistent storage, with less capability for expanding such resources. The mobile device also typically is powered by a battery. While a three-dimensional modeling system may be implemented in mobile device 100, the three-dimensional modeling system may be implemented in other devices such as a desktop computer, public display computer, an on-board computer in a vehicle, or a computer built into an appliance. Devices having limited power, hardware, or computing resources may advantageous include a three-dimensional modeling system as disclosed here.

It may be desirable to provide a three-dimensional model construction module 120 that uses limited memory and processing resources and that operates on an image sequence 116 from a single camera 102 on the device 100. The three-dimensional model construction module 120 generates the three-dimensional model 112, which can be used, for example, by an augmented reality and/or virtual reality application on the device. Other applications may take advantage of such a three-dimensional model, such as a three-dimensional modeling and/or animation tool.

Figure 2:
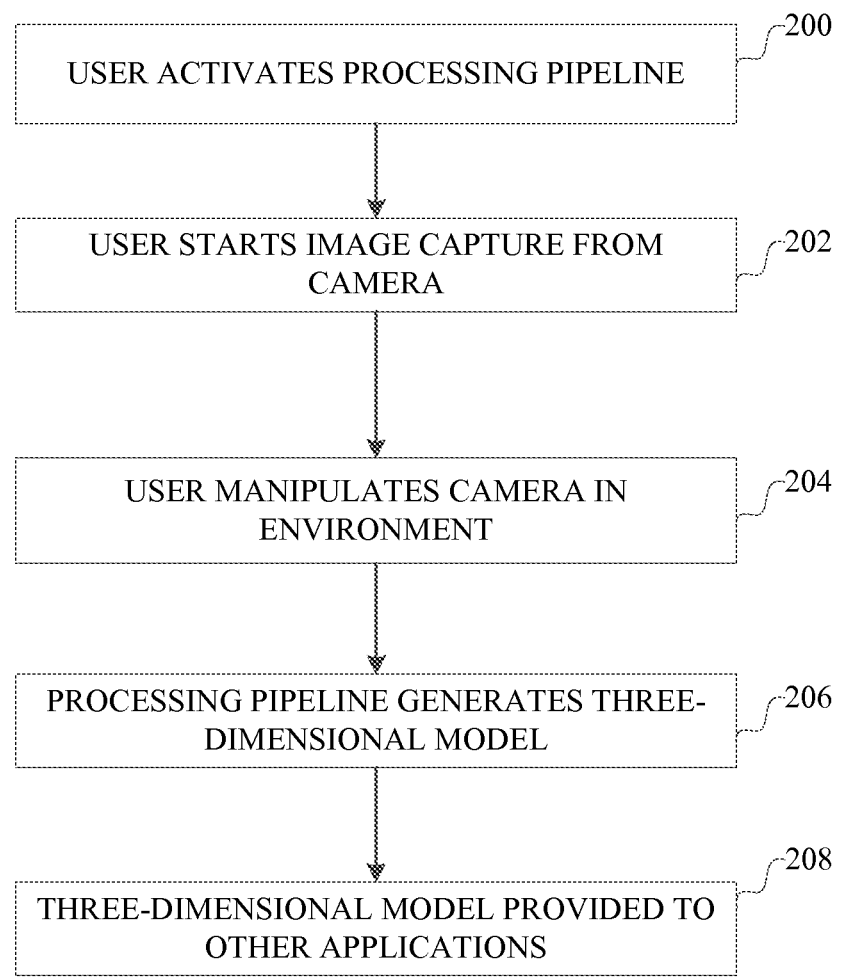
FIG. 2 is a flow chart describing how a user may use a device such as shown in FIG. 1.

In FIG. 2, a flow chart describes how a user interacts with an environment using a device such as shown in FIG. 1. A processing pipeline, such as described in FIG. 3, which implements the three-dimensional model construction module is activated in step 200. For example, an application on the device may be activated. In one example, the activation process may include a step of determining a scale of depth, e.g., an initial depth scaling. This determination may be based on input from a sensor, for example, a camera, gyroscope, or proximity sensor. In step 202, the user and/or a program executing on a device activates the camera so that it starts generating an image sequence. The application that provides the processing pipeline may have a control that allows the user to activate the camera.

In step 204, the user may manipulate the camera in the environment. The user may provide sufficient movement of the camera to allow the processing pipeline to receive a sufficient number of images from different angles of the environment, from which it can compute depth information based on differences between images at different camera poses. For example, the user may walk around an object or scene and point the camera at the object or scene from different directions, locations, or angles.

In step 206, given a sequence of images, the processing pipeline generates a three-dimensional model. The processing pipeline, using the example implementation described below, can begin outputting the model after processing as few as two frames of image data from the camera. The quality of the model improves as more frames of image data are processed. In step 208, the model can be provided to another application that uses the model, such as an augmented reality or virtual reality application.

Having now described an example use of such model construction, an example implementation of a processing pipeline will now be described in connection with FIGS. 3 through 5.

In this implementation, three components are advantageously combined, with minimal memory requirements, to generate a three-dimensional model with low latency. A high quality model may be achieved by fusion of depth maps of several images over time. One of the components determines a camera pose for each image to identify key frames and selects a key frame for each input image of the image sequence from the camera. Another component computes a depth map for each image by comparing the image to its corresponding one or multiple key frames. Another component performs volumetric fusion of the depth maps for each image into one global volumetric representation. It may be feasible to implement each component to process a batch of images from the sequence of images. Alternatively, the components may be implemented as a processing pipeline, in which each component processes its inputs from the preceding component successively at the rate the images are received from the camera. In this system, a model may be output with reduced latency and then successively improved as additional images are received from the camera.

Each component of the processing pipeline, as described below, may be implemented using the combination of a computer program running on a processor or programmable circuit of the device. Alternatively, each component can be implemented using a special purpose processing circuit such as an application-specific integrated circuit (ASIC), that may be part of the device.

Figure 3:
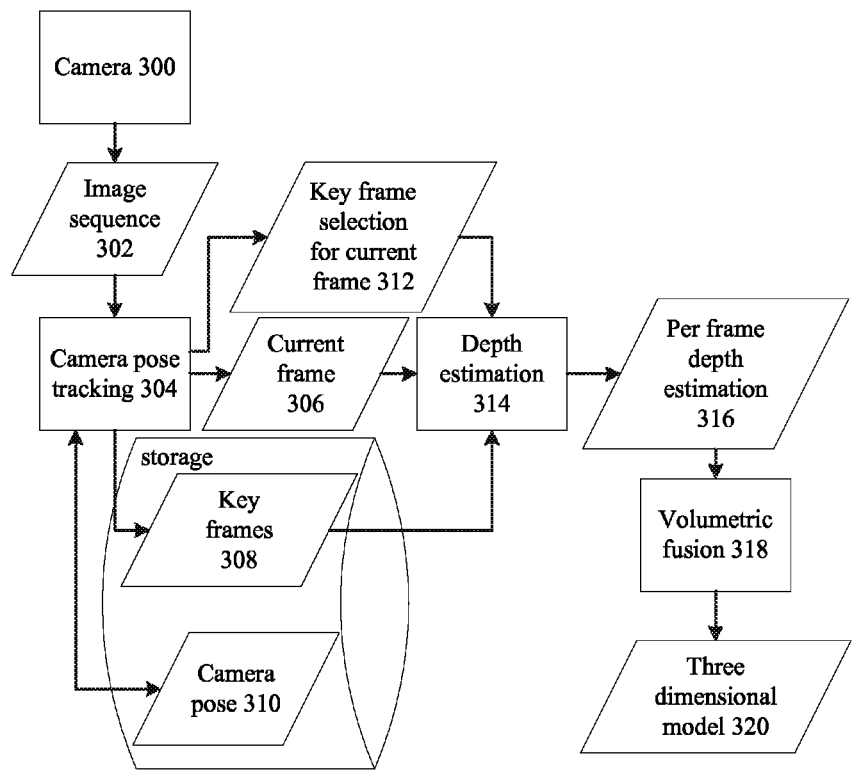
FIG. 3 is a data flow diagram describing a processing pipeline for generating three-dimensional models from an image sequence from a single camera.

In FIG. 3, the camera 300 provides an image sequence 302 to the first component, a camera pose tracking component 304. The camera pose tracking component passes through each successive image, as indicated at 306. The camera pose tracking component also generates key frames 308 and pose data for the key frames 310 that may be stored. Generally, the entire image sequence need not be stored; the key frames and pose data for each key frame may be sufficient.

Within the camera pose tracking component, the camera pose is compared to a most recent key frame to determine whether another key frame is to be generated. If the two poses are sufficiently different, then the current frame may be designated as a key frame.

Also within the camera pose tracking component, one or multiple key frames for comparing the current frame are selected, as indicated at 312. The selected key frame may be the most recently used key frame. Alternatively, other selections may be made that involve comparison of the current image and its pose to other key frames and their poses to identify one or multiple key frames which have the largest image overlap with the current frame. This may guarantee a greatest number of matches between pixels when performing depth map estimation, and may ensure that the viewpoints are different in the two views, so that each image provides a novel perspective on the scene and provides useful three-dimensional information.

The current image, and an indication of its selected one or multiple key frames, are passed to a depth estimation module 314. The depth estimation module determines a depth map 316 for the current image based on a comparison of the current image and its corresponding one or multiple key frames. Several techniques may be used for estimating the depth map. Generally, estimating the depth map involves matching every pixel in the current frame to every pixel in one or multiple of the selected key frames. Given a set of matched pixels between these two viewpoints, stereo triangulation is performed to obtain a depth estimate for each pixel.

For example, in one implementation, the depth map can be computed using a technique that computes both depth and surface normals. Alternatively, the computation of surface normals may be omitted and techniques for computing depth may be used. Further, the technique may use a Zero Mean Normalized Cross Correlation score (ZNCC) on small patches for cost computation. The ZNCC score compensates for local gain and offset changes, and thus handles large radiometric differences in the input images. Such radiometric changes are likely to occur because the input images are captured at different points in time. By using small patches, computational complexity and edge fattening artifacts are reduced.

The depth map 316 from each frame is received by a volumetric fusion module 318 that performs a fusion of the depth map with the current estimate of the three-dimensional model 320. Several techniques may be used for fusion of the depth map of each frame with the model.

For example, in one implementation, volumetric fusion may be performed using a three-dimensional model defined by a data structure as a virtual volume with signed distance fields representing surfaces. The volumetric fusion involves processing the sequence of noisy depth maps from the depth map estimator, and, for each frame, incrementally updating the volume by integrating (or fusing) surface observations into the stored signed distance filed. New data is added into empty regions, and existing data is filtered to remove noise based on the received depth map. The volume is raycast using the current camera pose estimate, marching individual rays through the grid, to find sign changes in the signed distance field (i.e., the zero-crossings) to extract surface points and normals. After several frames, the three-dimensional model begins to converge to a high quality result.

Figure 4:
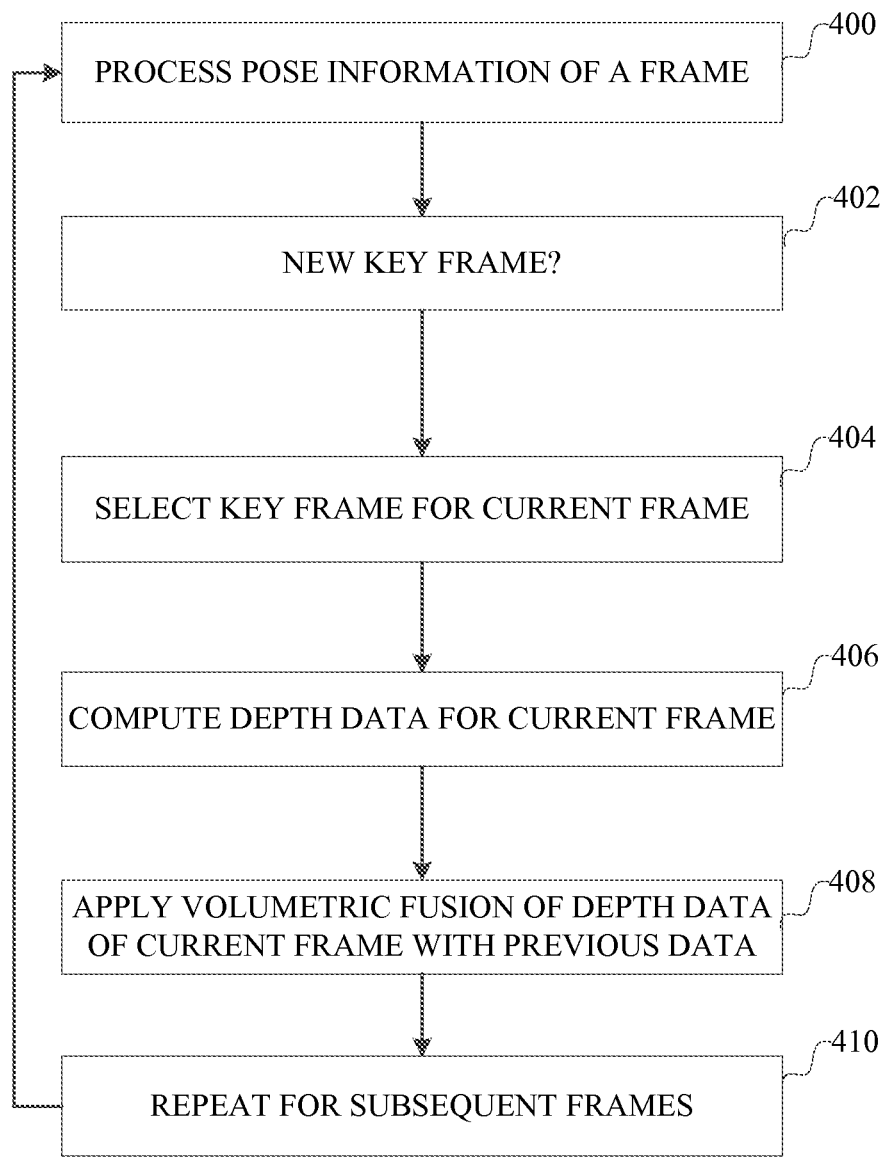
FIG. 4 is a flow chart describing an example operation of the processing pipeline shown in FIG. 3.

Referring now to FIG. 4, a flow chart an example operation of the processing pipeline shown in FIG. 3 will now be described.

Upon receiving a next frame in an image sequence from the camera, the pose information for the frame is processed 400. If the pose information is sufficiently different from other key frames as determined at 402, this frame can be marked as a key frame and stored. A key frame for comparison with the current frame is then selected 404. The depth data for the current frame is then computed 406 using the selected key frame. Volumetric fusion is then applied 408 to the depth map to merge it with previously computed depth information. The process repeats 410 for subsequent frames received from the camera.

The process described in FIG. 4 can be performed in a pipelined fashion, such that pose information for one frame is being processed while depth information for the previous frame is being computed, while the depth map for yet another frame is being merged with the three-dimensional model.

In the example implementation described above, various data structures are used to manage the data used by the processing pipeline, example implementations of which are shown in FIG. 5.

The key frames 500 that are stored in storage include the original image data 502 from the camera as well as associated pose information 504 generated by the camera pose estimation module. The pose information 504 can take several forms. An example implementation is to store rotation and translation of the camera with respect to a fixed coordinate system. A current frame and its pose information from the camera tracker may have the same data structure.

The depth map 510 output by the depth estimator for a frame includes a map 512, which is a matrix of depth values with the same x and y dimensions as the image data, and a depth value for each x, y pair or index to the matrix. Other data 514 about the depth map may also be provided.

Finally, the three dimensional model 520 output by the volumetric fusion module encodes surfaces implicitly as a signed distance field (SDF). Thus, a virtual volume 522 may be defined by x, y and z coordinates. A list 524 of surfaces is defined over time, with each surface being defined as a signed distance field 526 within the volume. This data structure is initialized with the camera assumed to be at the origin, which is also the center of a virtual volume's front face.

Figure 6:
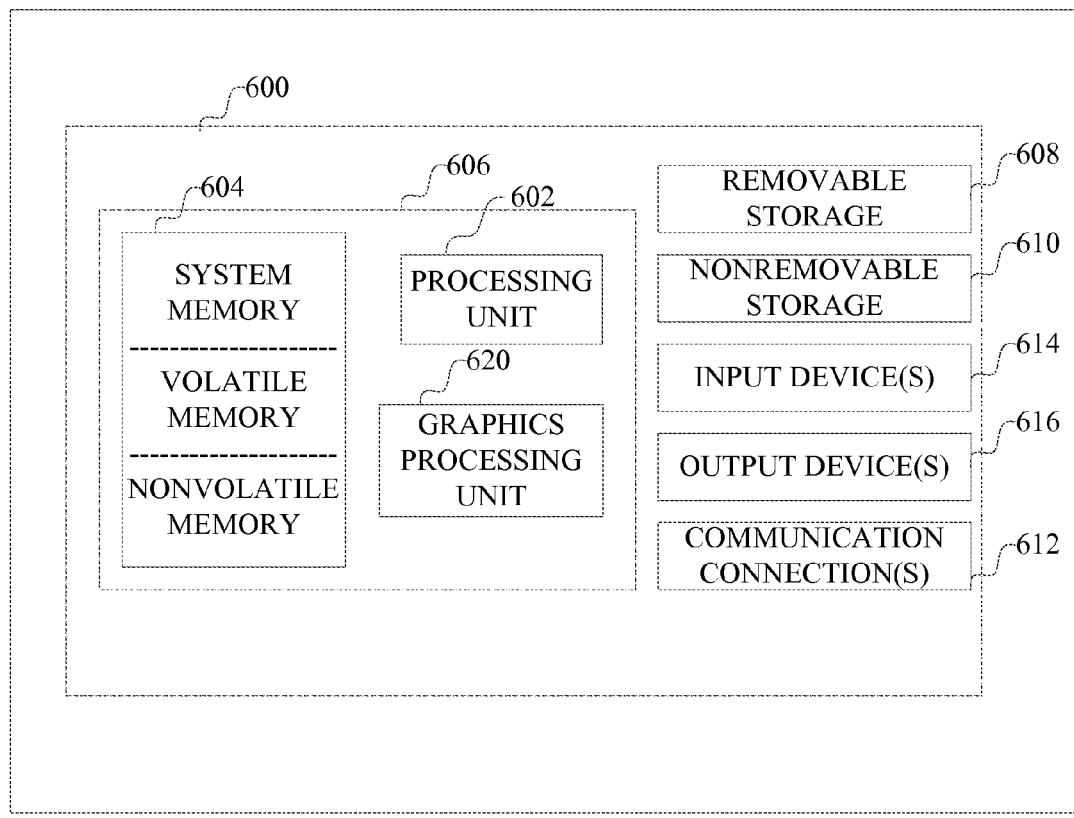
FIG. 6 is a block diagram of an example computer with which components of such a system can be implemented.

FIG. 6 illustrates an example computer in which three-dimensional modeling techniques may be implemented. This is only one example of a computer and is not intended to suggest any limitation as to the scope of use or functionality of such a computer. The following description is intended to provide a brief, general description of such a computer. The computer can be any of a variety of general purpose or special purpose computing hardware configurations. Examples of well-known computers that may be suitable include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, distributed computing environments that include any of the above systems or devices, and the like.

With reference to FIG. 6, an example computer 600, in a basic configuration, includes at least one processing unit 602 and memory 604. The computer can have multiple processing units 602. A processing unit 602 can include one or more processing cores (not shown) that operate independently of each other. Additional co-processing units, such as graphics processing unit 620, also can be provided. Depending on the configuration and type of computer, memory 604 may be volatile (such as RAM), non-volatile (such as ROM, flash memory, etc.) or some combination of the two. This configuration is illustrated in FIG. 6 by dashed line 606. The computer 600 also may include additional storage (removable and/or non-removable) including, but not limited to, magnetic or optical disks or tape. Such additional storage is illustrated in FIG. 6 by removable storage 608 and non-removable storage 610.

A computer storage medium is any medium in which data can be stored in and retrieved from addressable physical storage locations by the computer. Computer storage media includes volatile and nonvolatile, removable and non-removable media. Memory 604, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 600 may also contain communications connection(s) 612 that allow the device to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, radio frequency, infrared and other wireless media. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media, and may perform various functions with respect to that data.

Computer 600 may have various input device(s) 614 such as a keyboard, mouse, pen, camera, touch input device, sensor (e.g., accelerometer or gyroscope), and so on. Output device(s) 616 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, hover, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented using one or more computer programs processed by one or more processing units in the computer. A computer program includes computer-executable instructions and/or computer-interpreted instructions, which instructions are processed by one or more processing units in the computer. Generally, such instructions define routines, programs, objects, components, data structures, and so on, that, when processed by a processing unit, instruct the processing unit to perform operations on data, or configure the computer to include various devices or data structures. This computer system may be practiced in distributed computing environments where tasks are performed by remote processing devices that are linked through a communications network. In a distributed computing environment, computer programs may be located in both local and remote computer storage media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A device comprising:
    a camera tracking circuit comprising an input that receives a sequence of images from a single camera at an input rate, the camera tracking circuit being operative to process each current image from the sequence of images at the input rate, and comprising a first output providing a pose for the current image, and a second output providing the current image for storing in a storage designating the current image as a key frame based on the pose for the image and poses for other stored key frames from the storage, and a third output providing an indication of one or more key frames other than the current image from the storage selected for the current image, wherein the pose, the indication of the one or more selected key frames and the designation of the current image as a key frame, are output successively at the input rate for each current image;
    a depth map estimation circuit having a first input that receives the current image from the sequence of images, and the indication of the one or more selected key frames for the current image, and a second input receiving the selected one or more key frames from the storage, and having an output providing a depth map for the current image based on the current image and the one or more selected key frames; and
    a volumetric fusion circuit having an input receiving the depth map for the current image and an output providing a three-dimensional model as a fusion of depth maps received from the depth map estimation circuit for the sequence of images;
    wherein the depth map estimation circuit and the volumetric fusion circuit further process inputs and provide outputs successively for each current image at the input rate.

2. The device of claim 1, wherein the camera tracking circuit, the depth map estimation circuit, and the volumetric fusion circuit are implemented within a single general purpose integrated circuit.

3. The device of claim 1, wherein the depth map for an image comprises a measure of depth for each pixel in the current image.

4. The device of claim 1, wherein the pose for the current image comprises rotation and translation of the camera with respect to a fixed coordinate system.

5. The device of claim 1, wherein the three-dimensional model is defined in a virtual volume, wherein an initial pose of the camera is defined at a point in the virtual volume.

6. The device of claim 1, wherein the three-dimensional model is defined by representing a surface using a signed distance field in the virtual volume.

7. The device of claim 1, wherein the volumetric fusion circuit outputs the three-dimensional model after processing as few as the first two images from the sequence of images.

8. A process for generating a three-dimensional model from a sequence of images from a single camera, the process comprising:
receiving the sequence of images from the camera into memory at an input rate, to successively provide at the input rate a current image in memory for processing;
successively processing the current image in the memory at the input rate by repeating the following steps for each current image:
determining, using logic circuitry, a pose for the current image;
determining, using logic circuitry, whether the current image is to be designated as a key frame based on the pose of the current image and poses for other stored key frames from storage;
in response to determining that the current image is to be designated as a key frame, storing, the current image and the pose for the current image in the storage as a key frame;
selecting, using logic circuitry, a key frame other than the current image, from among the other key frames stored in the storage from the sequence of images;
computing, using logic circuitry, a depth map for the current image using the current image and the selected key frame for the current image;
merging, in memory, the depth map computed for the current image into a volumetric representation of a scene represented in the sequence of images; and
outputting, at the input rate, the volumetric representation of the scene from the memory.

9. The process of claim 8, further comprising determining a scale of depth by a sensor.

10. The process of claim 8, wherein the depth map determined for the current image comprises measures of depth for pixels in the current image.

11. The process of claim 8, wherein the pose for the current image comprises rotation and translation of the camera with respect to a fixed coordinate system.

12. The process of claim 8, wherein the three-dimensional model is defined in a virtual volume, wherein an initial pose of the camera is defined at a point in the virtual volume.

13. The process of claim 8, wherein the three-dimensional model is defined by representing a surface using a signed distance field in the virtual volume.

14. The process of claim 8, wherein outputting the three-dimensional model begins after processing as few as a first two images from the sequence of images.

15. A computer program product, comprising:
a computer storage device;
computer program instructions stored in the computer storage device that when read from the storage device and processed by a processor of a computer instruct the computer to perform a process for generating a three-dimensional model from a sequence of images from a single camera, the process comprising:
receiving the sequence of images from the camera into memory at an input rate, to successively provide at the input rate a current image in memory for processing;
successively processing the current image in the memory at the input rate by repeating the following steps for each current image:
determining, using logic circuitry, a pose for the current image;
determining, using logic circuitry, whether the current image is to be designated as a key frame based on the pose of the current image and poses for other stored key frames from storage;
in response to determining that the current image is to be designated as a key frame, storing, the current image and the pose for the current image in the storage as a key frame;
selecting, using logic circuitry, a key frame other than the current image, from among the other key frames stored in the storage from the sequence of images;
computing, using logic circuitry, a depth map for the current image using the current image and the selected key frame for the current image;
merging, in memory, the depth map computed for the current image into a volumetric representation of a scene represented in the sequence of images; and
outputting, at the input rate, the volumetric representation of the scene from the memory.

16. The computer program product of claim 15, wherein the processor is housed in a mobile device that incorporates the camera.

17. The computer program product of claim 15, wherein the depth map for the current image comprises measures of depth for pixels in the current image.

18. The computer program product of claim 15, wherein the pose for the current image comprises rotation and translation of the camera with respect to a fixed coordinate system.

19. The computer program product of claim 15, wherein the three-dimensional model is defined in a virtual volume, wherein an initial pose of the camera is defined at a point in the virtual volume.

20. The computer program product of claim 15, wherein the three-dimensional model is defined by representing a surface using a signed distance field in the virtual volume.

* * * * *